United States Patent
Blattert et al.

(10) Patent No.: US 9,108,599 B2
(45) Date of Patent: Aug. 18, 2015

(54) METHOD FOR OPERATING A PARKING BRAKE HAVING AN ELECTROMOTIVELY DRIVEN PARKING BRAKE MECHANISM

(71) Applicant: Robert Bosch GmbH, Stuttgart (DE)

(72) Inventors: Dieter Blattert, Kirchheim/Neckar (DE); Simon Hauber, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/104,280

(22) Filed: Dec. 12, 2013

(65) Prior Publication Data

US 2014/0172259 A1    Jun. 19, 2014

(30) Foreign Application Priority Data

Dec. 14, 2012    (DE) .......................... 10 2012 223 178

(51) Int. Cl.
| | |
|---|---|
| *G06F 19/00* | (2011.01) |
| *B60T 8/172* | (2006.01) |
| *B60T 7/12* | (2006.01) |
| *B60T 13/74* | (2006.01) |

(52) U.S. Cl.
CPC ................. *B60T 8/172* (2013.01); *B60T 7/122* (2013.01); *B60T 13/741* (2013.01)

(58) Field of Classification Search
CPC .................. B60K 6/543; B60K 15/04; B60K 2015/0483; B60K 6/365
USPC ........................ 701/22, 70, 99; 903/903, 918; 180/65.21, 65.25, 65.265
See application file for complete search history.

(56) References Cited

U.S. PATENT DOCUMENTS

| | | | | |
|---|---|---|---|---|
| 6,009,369 | A * | 12/1999 | Boisvert et al. .................. | 701/99 |
| 6,148,258 | A * | 11/2000 | Boisvert et al. .................. | 701/99 |
| 6,547,344 | B2 * | 4/2003 | Hada et al. ..................... | 303/191 |
| 6,672,415 | B1 * | 1/2004 | Tabata ......................... | 180/65.25 |
| 7,028,795 | B2 * | 4/2006 | Tabata ......................... | 180/65.21 |
| 7,273,120 | B2 * | 9/2007 | Tabata ......................... | 180/65.265 |
| 7,458,353 | B2 * | 12/2008 | Takahashi ..................... | 123/179.4 |
| 2007/0199533 | A1 * | 8/2007 | Takahashi ..................... | 123/179.4 |

FOREIGN PATENT DOCUMENTS

DE    10 2009 028 505 A1    2/2011

* cited by examiner

*Primary Examiner* — McDieunel Marc
(74) *Attorney, Agent, or Firm* — Maginot, Moore & Beck LLP

(57) ABSTRACT

A method for operating a parking brake with an electromotively driven parking brake mechanism includes applying the parking brake by the electric motor, switching off the electric motor in the state in which the parking brake is applied, switching on the electric motor after a prespecified time and reapplying the parking brake mechanism in the brake application direction. During the brake reapplication operation, an electrical variable of the electric motor is determined and compared with a reference value. The brake reapplication process is continued or terminated depending on whether the electrical variable, or a variable derived therefrom, is smaller or greater than the reference value.

10 Claims, 3 Drawing Sheets

METHOD FOR OPERATING A PARKING BRAKE HAVING AN ELECTROMOTIVELY DRIVEN PARKING BRAKE MECHANISM

This application claims priority under 35 U.S.C. §119 to patent application no. DE 10 2012 223 178.1 filed on Dec. 14, 2012 in Germany, the disclosure of which is incorporated herein by reference in its entirety.

BACKGROUND

The disclosure relates to a method for operating a parking brake having an electromotively driven parking brake mechanism, and also to a controller.

Parking brakes are used to keep a vehicle stationary without energy being consumed and without the driver having to operate the service brake for this purpose. The prior art discloses an extremely wide range of parking brakes, including electrically operated parking brakes, which are also called automatic parking brakes (APB). Parking brakes of this kind comprise an operator control element, for example a pushbutton, with which the parking brake can be locked or released when the vehicle is stationary. When the operator control element is operated, an associated controller identifies the parking brake request and correspondingly actuates an actuator, for example a hydraulic pump and/or an electric motor, in order to build up the brake pressure on the wheels of the vehicle and to lock the parking brake, or in order to release the parking brake.

A known type of parking brake comprises an electric motor for driving the parking brake mechanism of the brake which is located directly on the wheel brake ("motor on caliper" MoC) of the rear axle in order to apply or to release the brake there. DE 10 2009 028 505 discloses, for example, an automatic parking brake which comprises an electric motor and a hydraulic actuator which assists the electric motor. The electric motor acts directly on a brake piston of the hydraulic brake system by way of a gear mechanism, for example a spindle drive.

After a parking brake of this kind is applied and locked, the brake may be released slightly after a certain time and the vehicle may begin to roll unexpectedly. This problem occurs particularly if the brake had run hot before the vehicle was stopped and is locked in the hot state. The brake then cools down over time, as a result of which the mechanical components of the brake shrink slightly and therefore the braking action decreases.

In order to prevent the vehicle from rolling away, known parking brakes are reapplied after a certain time. According to the prior art, the parking brake is reapplied in two situations: in a first situation, a brake disc temperature model identifies that the brake has been operated at a high temperature. In this case, the parking brake is reapplied after a prespecified time, that is to say in a time-controlled manner. In another situation, the situation of the vehicle rolling away is identified, for example, by means of the wheel rotation speed sensors. In this case, the parking brake is immediately reapplied once a movement of the vehicle has been identified. However, both parking brake systems which are known from the prior art and have a brake reapplication function have certain disadvantages. In the first system, information about the brake disc temperature is firstly required, this being relatively complicated. Secondly, the parking brake is reapplied whenever the brake disc temperature exceeds a prespecified limit value, even if brake reapplication is not absolutely necessary. As a result, the components of the brake are unnecessarily subjected to loading. In contrast, the second system mentioned above comes into effect only when the vehicle has already been released and is beginning to roll away. This may be too late in many cases.

The object of the present disclosure is therefore to provide a method for operating an automatic parking brake which does not require temperature information and which reapplies the parking brake before the vehicle is released.

SUMMARY

This object is achieved by a method for operating a parking brake having an electromotively driven parking brake mechanism having the features of the disclosure, and a controller having the features of the disclosure. Further refinements of the disclosure can be found in the dependent claims.

The disclosure proposes a method for operating a parking brake having an electromotively driven parking brake mechanism, in which method the parking brake is initially applied by means of the electric motor, and the electric motor is then switched off in the state in which the parking brake is applied. According to the disclosure, the electric motor is switched on again after a prespecified time and the parking brake mechanism is driven in the brake application direction, that is to say reapplication of the parking brake is started. In the process, an electrical variable of the electric motor, such as the current which is consumed by the electric motor for example, is determined and compared with a reference value. In this case, the electrical variable which is determined when the parking brake is reapplied is a measure of the clamping force of the parking brake. Finally, the brake reapplication process is continued or terminated depending on the result of the comparison. According to one embodiment of the disclosure, a check can be made, for example, to determine whether the electrical variable is smaller or greater than the reference value. If it is found that the clamping force of the parking brake is smaller than a prespecified value, the brake reapplication process is continued; otherwise, the brake reapplication process is terminated. A method of this kind is relatively simple to implement. Furthermore, a parking brake of this kind does not require any information about the brake disc temperature.

The electrical variable which is determined when the parking brake is reapplied is preferably the current which is consumed by the electric motor, or a variable which is derived therefrom. The reference value is preferably a function of that current which is consumed by the electric motor during the brake application operation, for example when the maximum brake application force is reached, that is to say, for example, at the switch-off time. In this case, said current value is a measure of the brake application force which is generated by the electric motor. If the electric motor is switched on again after a prespecified switch-off time period, it is possible to use a current value comparison to establish whether and/or to what extent the brake application force has fallen and whether reapplication of the brake is necessary or not.

The reference value can also be a function of a hydraulic brake pressure or a variable which is proportional thereto, said hydraulic brake pressure or variable being present in the brake circuit, for example, at time at which the electric motor is switched off. If the vehicle has a hydraulic brake system with an admission pressure sensor, the measured admission pressure can be used, for example, to determine the reference value. The reference value depends on the hydraulic pressure on account of the electrical power which is to be applied by the electric motor being dependent on the assistance by the hydraulic brake. The greater the contribution made by the hydraulic brake, the lower the power which has to be applied by the electric motor in principle, and vice versa.

According to a specific embodiment of the disclosure, the reference value is given by the following equation:

$$I_{Ref} = I_{t4} + p\frac{r_{ges} \times \eta_{ges}}{A_B \times k_{Mot}},$$

where $I_{t4}$ is the current which is consumed by the electric motor (2) at the switch-off time $t_4$,
p is a hydraulic brake pressure,
$r_{ges}$ is a resulting radius from the transmission ratio and a spindle ratio,
$A_B$ is the brake piston area, and
$k_{Mot}$ is a motor constant.

According to another embodiment of the disclosure, the reference value $I_{Ref}$ can, for example, also be determined in accordance with the following equation:

$$I_{Ref} = I_{t4} + p\frac{r_{ges} \times \eta_{ges}}{A_B \times k_{Mot}} - T$$

where T is a tolerance threshold which can be, for example, empirically determined.

The actual reference value can be calculated in each case or else, for example, read out from a set of curves or a table which is stored in the system.

The time period between the electric motor being switched off and the start of the brake reapplication process can be, for example, between 3 mins and 15 mins, in particular between 4 mins and 8 mins, and preferably approximately 5 mins to 6 mins.

If the parking brake according to the disclosure identifies that reapplication of the brake is necessary, the parking brake is preferably reapplied until a prespecified brake application force is reached. It is clear to a person skilled in the art that the criterion "a prespecified brake application force is reached" can be monitored in various ways. In addition to measuring the actual brake application force, the current consumption by the electric motor could, for example, also be measured and compared with a reference value, in addition to many other options since: $F_{clamp} \sim M_{Mot} \sim kMot \times I_{Mot}$, where $F_{clamp}$ is the application force of the parking brake, $M_{Mot}$ is the torque of the electric motor, and $k_{Mot}$ is a motor constant. As can be seen, there is a proportional relationship between the clamping force $F_{clamp}$ and the motor current $I_{Mot}$.

In order to establish whether the brake application force has reached a prespecified value, it is also possible, for example, to determine whether the current which is consumed by the electric motor satisfies the following equation when the parking brake is applied:

$$I = I_{t7} + (I_{ref} - I_{limit}),$$

where $I_{t7}$ is a minimum value for the current I, which is consumed by the electric motor, when the parking brake is reapplied after a prespecified time ($T_{postrun}$)
$I_{ref}$ is a reference value for the current, which is consumed by the electric motor, as a function of the current $I_{t4}$, and
$I_{limit}$ is the theoretical minimum value for the current I, which is consumed by the electric motor, when the parking brake is reapplied after a maximum cooling time, that is to say in the cold state of the brake.

BRIEF DESCRIPTION OF THE DRAWINGS

The disclosure is explained by way of example in greater detail below with reference to the appended drawings, in which.

DETAILED DESCRIPTION

Figure 1:
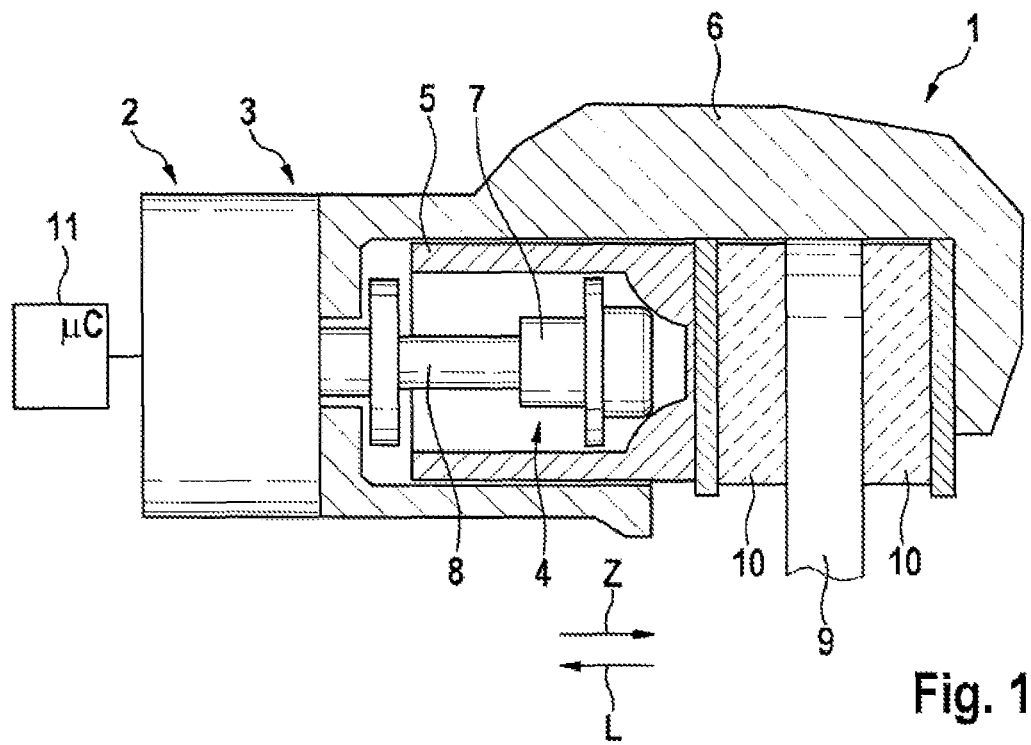
FIG. 1 shows a sectional view through an electromechanical parking brake for a vehicle, having an electromotively operated parking brake mechanism.

FIG. 1 shows an electromechanical parking brake 1 for keeping a vehicle stationary. The parking brake 1 comprises a caliper 6 which surrounds a brake disc 9 in the form of a brake caliper. The brake caliper is part of a hydraulically operated service brake in this case.

The parking brake 1 further comprises a parking brake mechanism 4 which is operated by means of an electric motor 2. In the process, the electric motor 2 drives a spindle 8 to rotate by means of a step-down gear mechanism 3. A component which is designed as a spindle nut 7 is arranged in a rotationally fixed manner on the threaded spindle 8, said component moving axially either in the brake application direction Z or in the release direction L of the brake when the threaded spindle 8 is rotated. In this case, the threaded spindle 8 and the spindle nut 7 are arranged within a brake piston 5, a brake lining carrier and a brake lining 10 being fastened to that side of said brake piston which faces the brake disc 9. A further brake lining 10, which is fastened to the brake caliper 6, is located on the opposite side of the brake disc 9.

In order to apply the parking brake, the electric motor 2 is operated in such a way that the spindle nut 7 moves in the application direction Z, so that it presses against the base of the brake piston 5 and moves said brake piston in the application direction Z. Application of the parking brake can be assisted by a build-up of hydraulic brake pressure, with the resulting brake force then being made up of an electromotive component and a hydraulic component. The hydraulic brake pressure can be built up, for example, automatically by means of a hydraulic pump, but it can also be generated by the driver by operating the brake pedal.

The electric motor 2 is switched off as soon as a desired brake application force is reached. In this case, the application force of the brake is determined from the motor current I. The electric motor 2 of the parking brake 1 is actuated by means of a controller 11 in which a suitable braking algorithm is stored. Since the parking brake mechanism 4 is designed to be self-locking, the parking brake 1 remains in this state in a stable manner, and the vehicle is held without energy being consumed.

Figure 2:
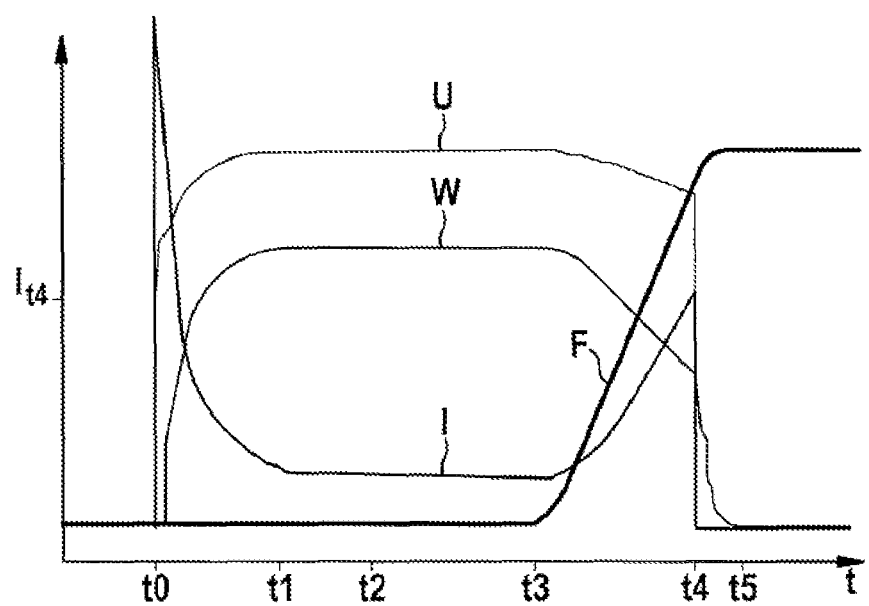
FIG. 2 shows the time profile of various operating variables of a parking brake during an application process of the brake.

FIG. 2 shows the time profile of various operating variables of the parking brake from FIG. 1 during a brake application process. The motor current I, the motor voltage U, the brake application force F and the angular speed ω of the electric motor 2 are illustrated in the present case.

At the beginning of the brake application process, at time $t_0$, a brake application request is identified and the electric motor 2 of the parking brake 1 is switched on. Switching on the electric motor 2 creates a current peak which falls as the profile continues, until a no-load current is established approximately at time $t_1$. The motor voltage U increases over this time period, as does the motor rotation speed ω. The brake linings 10 do not yet bear against the brake disc 9 in the no-load phase; to this end, the release clearance of the brake first has to be overcome. The brake linings 10 meet the brake disc 9 approximately at time $t_3$. In the further course of the brake application process, a brake force F builds up, said force being substantially proportional to the motor current I:

$$F \sim M_{Mot} \sim k_{Mot} \times I$$

The brake force F increases approximately linearly between times $t_3$ and $t_4$. In the process, the rotation speed ω and similarly the motor voltage U simultaneously fall due to the increased loading on the electric motor. In contrast, the motor current I increases. A desired brake application force F is reached, and the electric motor 2 switched off, at time $t_4$.

While the vehicle is stationary, the parking brake 1 cools down to the ambient temperature. The brake application force F falls as the temperature falls and in the process follows an exponential characteristic curve, where:

$$F(t) = F_0 \times e^{\frac{-t}{\tau}}$$

In order to check whether the application force F of the parking brake 1 is still high enough to securely hold the vehicle after a certain time, the electric motor 2 is switched on again after a prespecified time, for example after 5 mins to 10 mins, and the parking brake mechanism 4 is driven in the brake application direction. That is to say a brake reapplication process is started.

Figure 3:
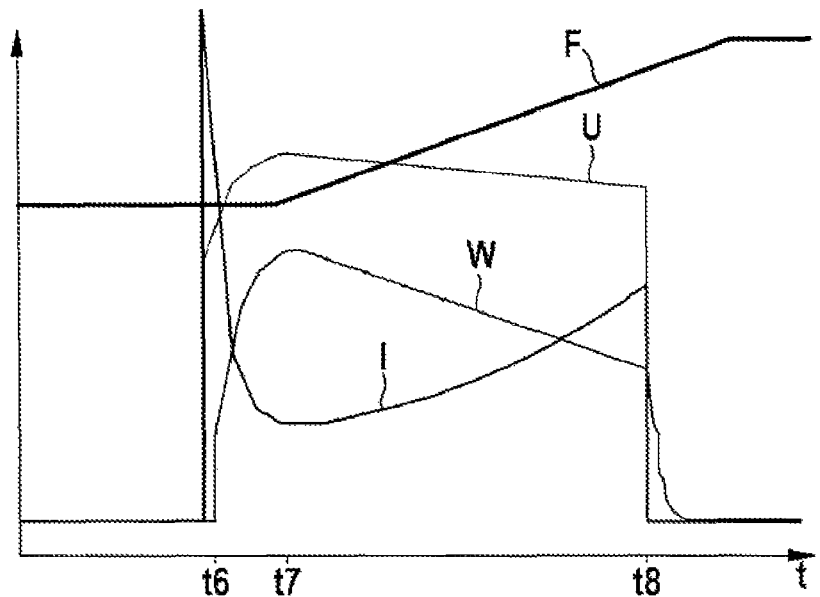
FIG. 3 shows the time profile of various operating variables of a parking brake during a reapplication process of the brake.

FIG. 3 now shows various operating variables of the parking brake 1 during a brake reapplication process of this kind. In the present example, the motor current I, the motor voltage U, the angular speed ω of the electric motor 2, and the brake application force F are again shown in said figure. As can be seen, switching on the electric motor 2 again produces a current peak which, as the profile continues, falls to a minimum value $I_{t7}$ approximately at time $t_7$, and then rises again. The motor voltage U and the angular speed ω exhibit approximately the inverse profile.

In order to now establish whether the brake application force F is still sufficient to securely hold the vehicle stationary, the minimum value $I_{t7}$ of the motor current I is compared with the reference value $I_{Ref}$. In the process, it is determined whether the following criterion is satisfied:

$$I_{t7} < I_{Ref}$$

If the criterion is satisfied, it is assumed that the brake has to be reapplied since a low current value $I_{t7}$ means that the mechanical loading on the electric motor 2 during brake application is relatively low. The brake reapplication process is therefore continued. If, in contrast, the criterion is not satisfied, this means that the parking brake is still applied to a sufficient degree. The brake reapplication process is therefore terminated. The above-described threshold value comparison therefore has the advantage that the brake 1 is reapplied only when it is actually required. As a result, the mechanical components of the brake are firstly conserved and secondly energy can be saved. Instead of comparing the motor current I with a reference value $I_{Ref}$, it is also possible to compare another operating variable of the brake, for example a torque or a force, with a corresponding reference value.

The reference value $I_{Ref}$ is preferably a function of the current $I_{t4}$ which is consumed by the electric motor 2 approximately at the switch-off time at the end of the first brake application process and can optionally also be a function of a hydraulic brake pressure. According to a specific embodiment of the disclosure, the reference value $I_{Ref}$ is determined in accordance with the following equation:

$$I_{Ref} = I_{t4} + p \frac{r_{ges} \times \eta_{ges}}{A_B \times k_{Mot}}$$

where $I_{t4}$ is the current which is consumed by the electric motor (2) at the switch-off time $t_4$, p is a hydraulic brake pressure, $r_{ges}$ is a resulting radius from the transmission ratio and a spindle ratio, $A_B$ is the brake piston area, and $k_{Mot}$ is a motor constant.

In this case, the reference value $I_{Ref}$ can either be calculated on the basis of the abovementioned formula or, if it is already stored in the system, read from a table or a set of curves for example.

The brake reapplication process is preferably carried out until a prespecified brake application force is reached. A specific brake application force is reached, for example, when the current I which is consumed by the electric motor 2 satisfies the following equation:

$$I = I_{t7} + (I_{ref} - I_{limit})$$

where $I_{t7}$ is a minimum value for the current (I), which is consumed by the electric motor (2), when the parking brake (1) is reapplied after a prespecified time ($T_{postrun}$), $I_{ref}$ is a reference value for the current, which is consumed by the electric motor (2), as a function of the current $I_{t4}$, and $I_{limit}$ is the theoretical minimum value for the current (I), which is consumed by the electric motor (2), when the parking brake (1) is reapplied in the cold state.

It is clear to a person skilled in the art that another operating variable of the electric motor 2, such as a motor torque M or the brake application force F for example, can be monitored instead of the current I in order to estimate the brake application force.

Figure 4:
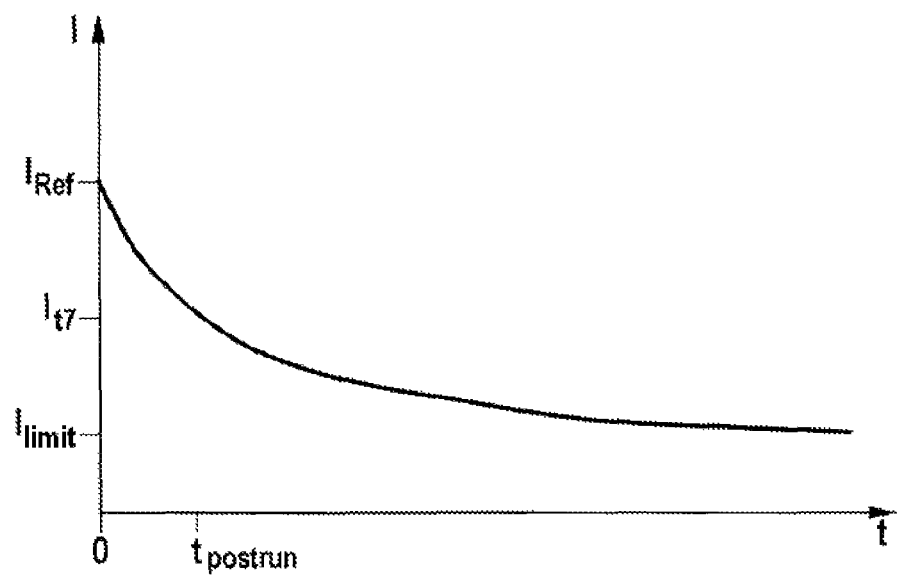
FIG. 4 shows the current which is required by the electric motor for reapplying the parking brake, depending on the cooling time of the brake.

FIG. 4 once again shows the motor current I which the electric motor 2 would require at the minimum in order to reapply the parking brake 1 as a function of the cooling time t. The longer the parking brake 1 cools down, the smaller the motor current I in principle, with the characteristic curve asymptotically approaching a limit value $I_{limit}$ which represents that current which the electric motor 2 requires at the minimum when the brake 1 has cooled down to ambient temperature.

Figure 5:
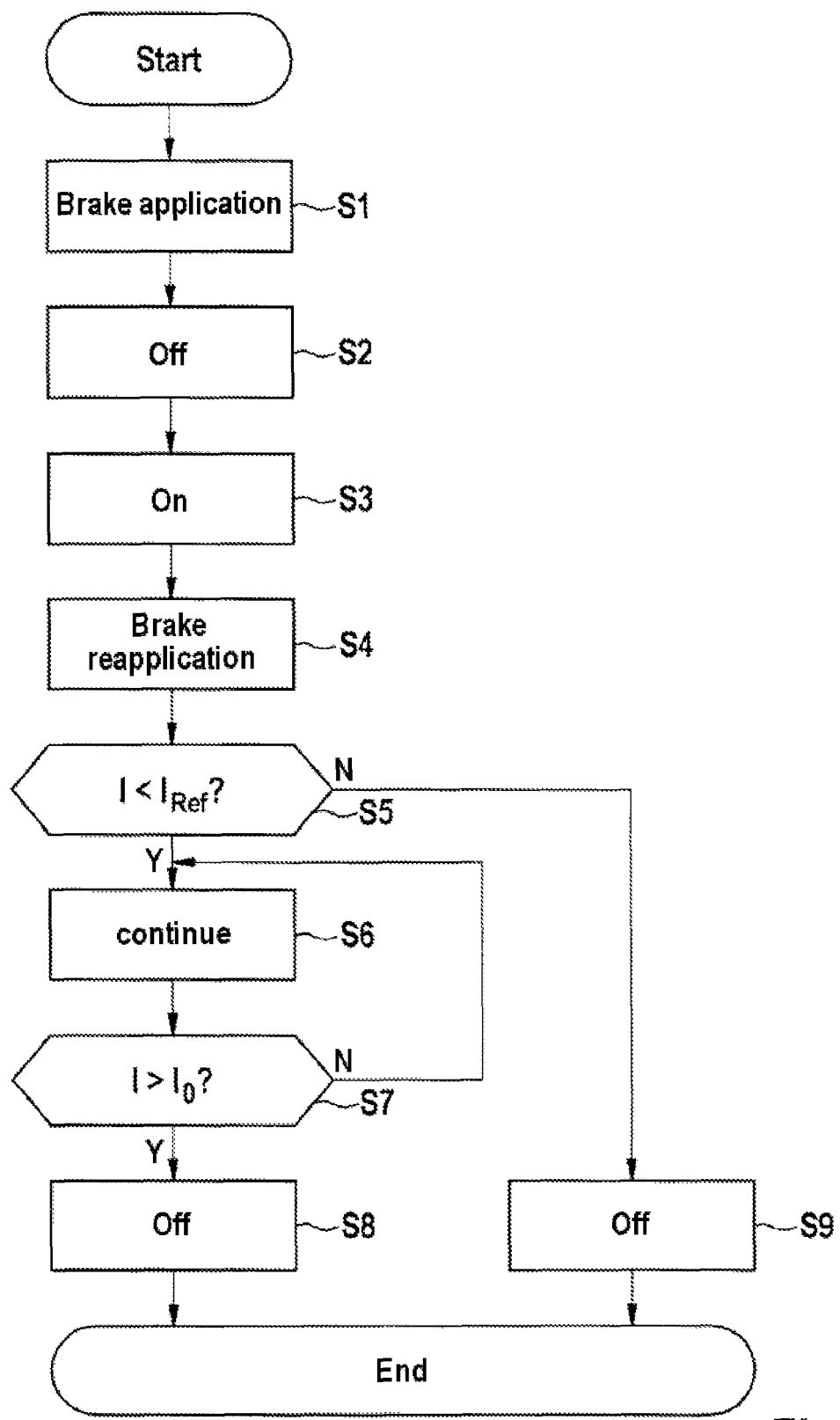
FIG. 5 shows a flowchart with various method steps for actuating a parking brake according to one embodiment of the disclosure.

FIG. 5 once again shows the essential method steps of a method for operating a parking brake 1, wherein step S1 represents the application of the brake; the electric motor is switched off in step S2 and switched on again in step S3 after a prespecified waiting time. The brake reapplication process starts in step S4, with the motor current I being compared with a reference value in step S5. If the motor current I is smaller than the reference value, the brake reapplication process is continued in step S6. If, in contrast, the motor current I is greater than the reference value, the brake reapplication process is terminated. Returning to step S6, the brake reapplication process is continued until the brake application force of the brake 1 exceeds a prespecified threshold value. When this is the case, the brake reapplication process is terminated and the method ends.

What is claimed is:

1. A method for operating a parking brake having an electromotively driven parking brake mechanism, comprising:

applying the parking brake by use of the electric motor;

switching off the electric motor in the state in which the parking brake is applied;
switching on the electric motor after a prespecified time and starting a brake reapplication process by driving the parking brake mechanism in the brake application direction;
determining with a controller an electrical variable of the electric motor during the brake reapplication operation;
comparing with the controller the determined electrical variable, or a variable derived therefrom, with a reference value; and
continuing the brake reapplication process or terminating the brake reapplication process depending on the result of the comparison.

2. The method for operating a parking brake according to claim 1, wherein the reference value is a function of the current consumed by the electric motor at the switch-off time, or a variable that is proportional to the current.

3. The method for operating a parking brake according to claim 1, wherein the reference value is a function of a hydraulic brake pressure, or a variable that is dependent thereon, applied to the parking brake at the time at which the electric motor is switched off.

4. The method for operating a parking brake according to claim 1, wherein the reference value is determined in accordance with the following equation:

$$I_{Ref} = I_{t4} + p\frac{r_{ges} \times \eta_{ges}}{A_B \times k_{Mot}}$$

where $I_{t4}$ is the current which is consumed by the electric motor at the switch-off time $t_4$,
p is a hydraulic brake pressure,
$r_{ges}$ is a resulting radius from the transmission ratio and a spindle ratio,
$A_B$ is the brake piston area, and
$k_{Mot}$ is a motor constant.

5. The method for operating a parking brake according claim 1, wherein the reference value is determined in accordance with the following equation:

$$I_{Ref} = I_{t4} + p\frac{r_{ges} \times \eta_{ges}}{A_B \times k_{Mot}} - T$$

where $I_{t4}$ is the current which is consumed by the electric motor at the switch-off time $t_4$,
p is a hydraulic brake pressure,
$r_{ges}$ is a resulting radius from a transmission ratio and a spindle ratio,
$A_B$ is the brake piston area,
$k_{Mot}$ is a motor constant, and
T is a tolerance threshold.

6. The method for operating a parking brake according to claim 1, wherein the electric motor is switched on again, and the parking brake is reapplied, after a time period of from 3 mins to 15 mins.

7. The method for operating a parking brake according to claim 1, wherein the parking brake is reapplied until a prespecified brake application force is reached.

8. The method for operating a parking brake according to claim 1, wherein the parking brake is reapplied until a prespecified brake application force is reached, and wherein, as the criterion for the prespecified brake application force is reached, it is determined whether the current consumed by the electric motor satisfies the following equation:

$$I=I_{t7}=(I_{ref}-I_{limit})$$

where $I_{t7}$ is a minimum value for the current consumed by the electric motor when the parking brake is reapplied after a prespecified time,
$I_{ref}$ is a reference value for the current consumed by the electric motor as a function of the current $I_{t4}$, and
$I_{limit}$ is the theoretical minimum value for the current consumed by the electric motor when the parking brake is reapplied in the cold state.

9. A controller including a device for carrying out a method for operating a parking brake having an electromotively driven parking brake mechanism, the method including:
applying the parking brake by use of the electric motor;
switching off the electric motor in the state in which the parking brake is applied;
switching on the electric motor after a prespecified time and starting a brake reapplication process by driving the parking brake mechanism in the brake application direction;
determining with the controller an electrical variable of the electric motor during the brake reapplication operation;
comparing with the controller the determined electrical variable, or a variable derived therefrom, with a reference value; and
continuing the brake reapplication process or terminating the brake reapplication process depending on the result of the comparison.

10. The method for operating a parking brake according to claim 6, wherein the time period is approximately from 4 mins to 8 mins.

* * * * *